(12) United States Patent
Zegg

(10) Patent No.: US 6,808,634 B1
(45) Date of Patent: Oct. 26, 2004

(54) METHOD AND DEVICE FOR CROSS-FLOW FILTRATION

(75) Inventor: Herbert Zegg, Gratwein (AT)

(73) Assignee: Andritz AG, Graz (AT)

( * ) Notice: Subject to any disclaimer, the term of this patent is extended or adjusted under 35 U.S.C. 154(b) by 0 days.

(21) Appl. No.: 09/890,589

(22) PCT Filed: Jan. 31, 2000

(86) PCT No.: PCT/EP00/00750

§ 371 (c)(1),
(2), (4) Date: Oct. 15, 2001

(87) PCT Pub. No.: WO00/47312

PCT Pub. Date: Aug. 17, 2000

(30) Foreign Application Priority Data

Feb. 8, 1999 (AT) ............................................... 155/99

(51) Int. Cl.$^7$ .......................... B01D 61/00; B01D 63/16; B01D 65/02
(52) U.S. Cl. ............. 210/650; 210/321.67; 210/321.68; 210/636; 210/649; 210/780
(58) Field of Search ........................ 210/321.67, 321.68, 210/641, 649, 650, 636, 780

(56) References Cited

FOREIGN PATENT DOCUMENTS

| JP | 61-25607 | * | 2/1986 |
| JP | 3-188926 | * | 8/1991 |
| JP | 5-84429 | * | 4/1993 |
| JP | 5-228349 | * | 9/1993 |
| JP | 6-210295 | * | 8/1994 |
| JP | 7-075722 | * | 3/1995 |
| JP | 7-185269 | * | 7/1995 |

OTHER PUBLICATIONS

Patent Abstracts of Japan, vol. 17, No. 413, C–1092 (1993) corresponding to JP 5–084429.*
Patent Abstract of Japan, vol. 17, No. 685, C–1142 (1993) corresponding to JP 5–228349.*
Patent Abstract of Japan, vol. 10, No. 178, C–355 (1986) corresponding to JP 61–025607.*
Ripperger S., "Mikrofiltration mit Membranen", pp. 188, 199 (1994).*
Patent Abstract of Japan, vol. 1995, No. 06 (1995) corresponding to JP 7–075722.*
Patent Abstract of Japan, vol. 18, No. 575, C–1268 (1994) corresponding to JP 6–210295.*
Patent Abstract of Japan, vol. 1995, No. 10 (1995) corresponding to JP 7–185269.*
Patent Abstract of Japan, vol. 15, No. 445, C–0884 (1991) corresponding to JP 3–188926.*

* cited by examiner

*Primary Examiner*—John Kim
(74) *Attorney, Agent, or Firm*—Alix, Yale & Ristas, LLP

(57) ABSTRACT

The invention relates to a process for cross-flow filtration with membranes. It is mainly characterized by the membranes being moved relative to each other. The invention also relates to a device for carrying out the process, where at least two hollow membrane discs are provided, which rotate around one hollow shaft each.

9 Claims, 4 Drawing Sheets

METHOD AND DEVICE FOR CROSS-FLOW FILTRATION

CROSS-REFERENCE TO RELATED APPLICATIONS

This is the national stage of International Application No. PCT/EP00/00750.

BACKGROUND OF THE INVENTION

The invention relates to a process for cross-flow filtration with rotating membrane discs, with the filtrate that was passed through the membrane disc(s) being routed in the hollow disc body radially to the rotational axis, and there being led outward through the hollow shaft, with the membrane discs having the same sense of rotation and with a turbulence being created at the membrane surface in the area of overlapping of at least two membrane discs.

Processes and devices are known where liquids are cleaned by fixed membranes such as, for instance, tubular membranes or fixed membrane discs. In the case of membrane discs, the filtrate is fed on one side of the circumference and the concentrate is discharged on the other side. The permeate is discharged after having passed through the membrane. The problem with tubular membranes is that only a small filter area can be used per unit of volume. Also, the filtrate must be backwashed after some time so as to reach the full filtration capacity again. At large filtration capacities of more than 5 to 10 $m^3$ per hour a large number of modules must be placed in parallel or in series to achieve the required filter area. This requires a high amount of pipework and causes enormous space requirement. High pressure losses in the retentate channels (feed of the raw water to be filtered) of the modules necessitate high pump capacities.

For instance, JP 7-75722 (Agency of Ind.) shows a filter having several membrane discs, where the liquid in the disc body is led to the rotational axis and from there outward through the hollow shaft. The disc body seems to consist of a homogenous polypropylene body (without channels). The system works at a vacuum (operating pressure 0.5 $kg/cm^2$). A disadvantage in this case is the large flow resistance in the disc body and in the discharge of the filtrate by vacuum. JP 6-210295 (Hitachi Plant) describes a flocculation and filtration device. This is an open system, in which the filtrate is extracted by vacuum. This is to prevent the risk of clogging. In addition, flocculent and a medium that controls the pH value is injected into the suspension. A circumferential speed of 2.2 m/s is mentioned for the disc. This would cause overflow speeds in the range of approximately 1 m/s for the mentioned operating mode and overlapping. At such a speed, cleaning of the membrane discs would not be sufficient.

SUMMARY OF THE INVENTION

The invention is to ensure a filter module with a large filter area per volume unit and thus low space requirement but without the necessity of backwashing.

The invention is characterized by overflow speeds being created at the surface of the membranes, which are in the range between 1 and 5 m/s, and by the concentrate being discharged at an overpressure, where the overpressure may be up to 10 to 14 bar.

At these overflow speeds good cleaning of the membrane surface can be ensured, which prevents or at least minimizes formation of a deposit layer. Due to the overpressure on the concentrate side of the membrane, which may be considerably higher contrary to a vacuum on the permeate side, considerably better filtration can also be achieved.

An advantageous configuration of the invention is characterized by the discs having a rectangular cross section.

A favorable advancement of the invention is characterized by the discs having a triangular cross section.

An advantageous configuration of the invention is characterized by the membrane discs having different rotational speeds. This permits setting a desired overflow speed and/or relative speed in the overlapping area.

An advantageous configuration of the invention is characterized by the permeate being discharged at a vacuum, where the vacuum may be up to 0.5 bar. A suitable pressure difference (trans-membrane pressure) is thereby created for filtration.

BRIEF DESCRIPTION OF THE DRAWINGS

The invention will now be described in examples and referring to the drawings, where.

DETAILED DESCRIPTION OF THE PREFERRED EMBODIMENT

Figure 1:
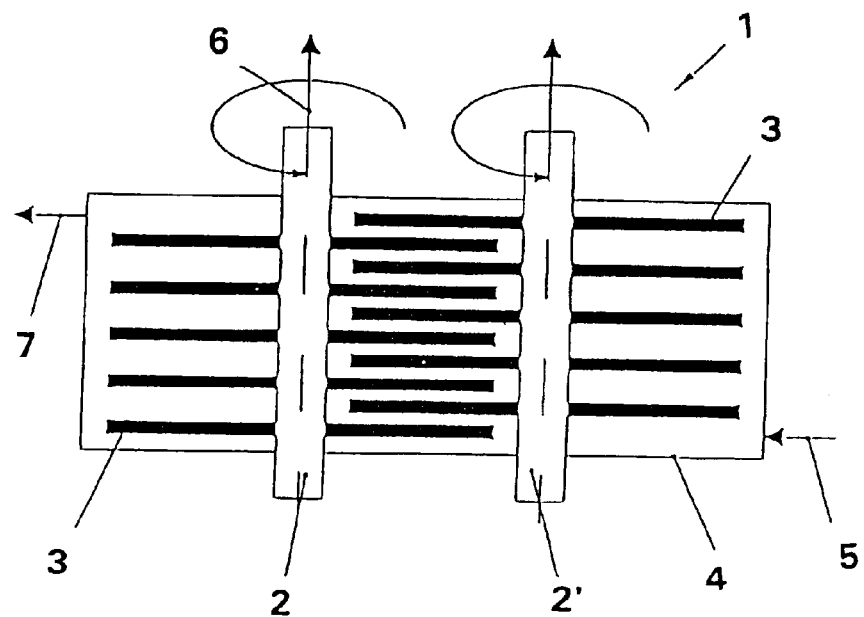
FIG. 1 is a schematic, cross section view of a first embodiment of a cross-flow filtration module in accordance with the invention.

FIG. 1 shows a cross-flow filtration module 1 according to the invention. Several membrane discs 3 are mounted here on the hollow shafts 2, 2'. The liquid/suspension to be filtered is fed to a casing 4 through pipe 5. A closed casing 4 is shown here. It is also possible to have an open casing, where the membranes are immersed in liquid. Here, the membrane discs 3 have a cylindrical cross section. The filtrate passes through the membrane into the hollow disc body 3 and is led to the center of the disc as permeate and outward through the hollow shaft 2, 2' and through a pipe 6. The cleaned concentrate is subsequently discharged through pipe 7. The membrane module 1 can be operated both with concentrate side overpressure and also with vacuum on the permeate side. Accordingly, module 1 can be used in closed container 4 or as immersed membranes. The overpressure may be up to 10–14 bar. The temperature of the solution to be filtered may be up to 70–80° C. depending on the application.

The membrane discs 3 may consist both of inorganic bodies and also of carrier bodies with a polymer membrane.

The design is suitable both for chemical cleaning of the membranes in co-current flow operation and also for fully automatic permeate backwash. The filtration modules 1 may be used for micro-filtration (starting at approximately 0.3 $\mu$m), ultra-filtration, nano-filtration (up to approximately 4000 Daltons) up to reverse osmosis in such areas as drinking water treatment, process water treatment, municipal and industrial waste water treatment and also product filtration. Permeate capacities of 10–20 m$^3$ per hour can be achieved per filtration module.

Figure 2:
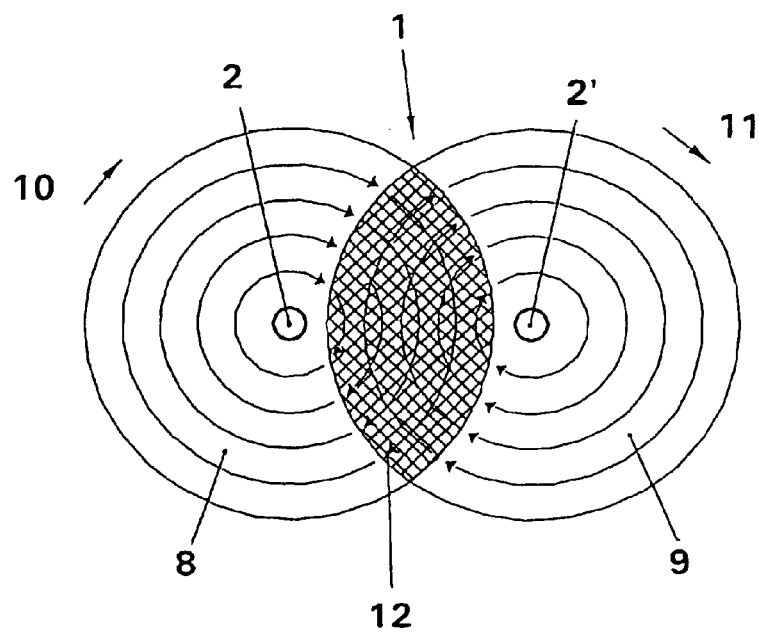
FIG. 2 is a side view of the cross-flow filtration module of FIG. 1.

FIG. 2 shows a horizontal projection of the filtration module 1 in FIG. 1. The hollow shafts 2, 2' serving for permeate discharge can be seen. A primary rotation membrane 8 and a secondary rotation membrane 9 turn around these hollow shafts 2, 2'. Primary rotation membrane 8 turns in direction 10 and secondary rotation membrane 9 in direction 11. In the overlapping area 12 a turbulence cleaning zone is created. This turbulence results from the membranes counter-rotating in the overlapping area 12. With this turbulence, an additional cleaning effect is created on the membrane surface. The turbulence can also be generated by special flow devices. Through the mechanical drive of the membrane discs 8 and 9, the turbulent flow and the high specific filtration capacity connected with this, very low operating costs are achieved. The specific power requirement for the drive is approximately 2.5 kWh/m$^3$ of permeate. The chemical cleaning interval can be increased from currently approximately 50–100 hours to approximately 200–500 operating hours depending on the application.

Figure 3:
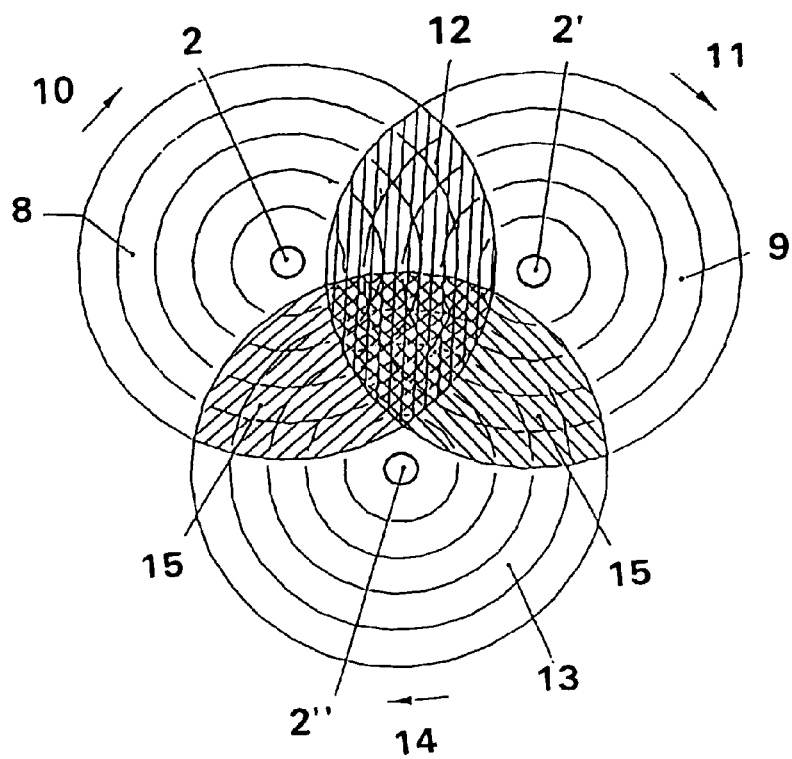
FIG. 3 is a side view of a second embodiment of a cross-flow filtration module in accordance with the invention.

If a higher rotational speed is required and the disc diameter has to be decreased, several hollow shafts and membrane discs mounted on them are used in order to achieve at least the same filter area. FIG. 3 shows a variant with three hollow shafts 2, 2' and 2" and pertinent membrane discs 8, 9, 13. Rotation of disc 13 in direction 14 results in a further turbulence cleaning zone 15.

Figure 4:
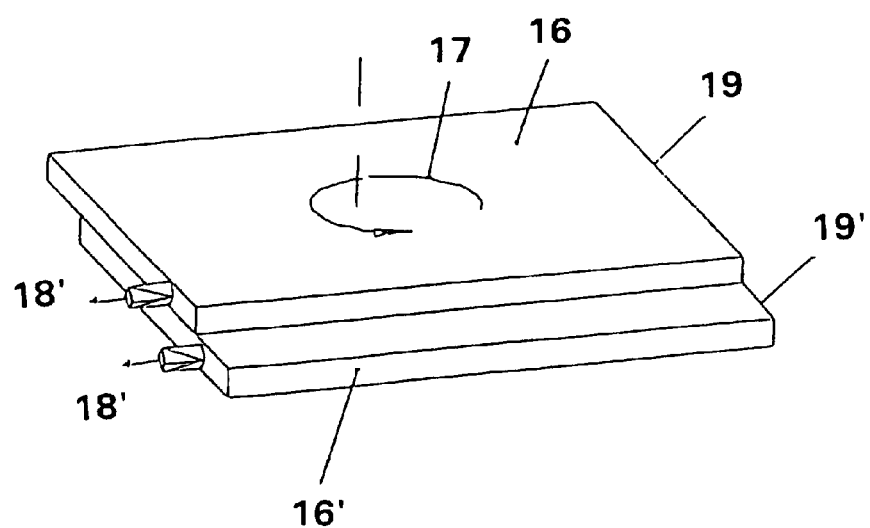
FIG. 4 is a perspective view of a third embodiment having membrane plates.

FIG. 4 shows an alternative to the membrane discs, where plates 16, 16 are used as membranes. While plate 16' is fixed, plate 16 is moved eccentrically oscillating along arrow 17, so that a turbulence results at the membrane surfaces, which keeps the surfaces largely free from deposits. The permeate discharge takes place through pipes 18, 18', but additional pipes 19, 19' can be mounted for better discharge on the opposite side of plates 16, 16'. The pipes 18, 19 which are connected to the moving plate 16 can be designed as flexible tubes or suitable hoses.

Figure 5:
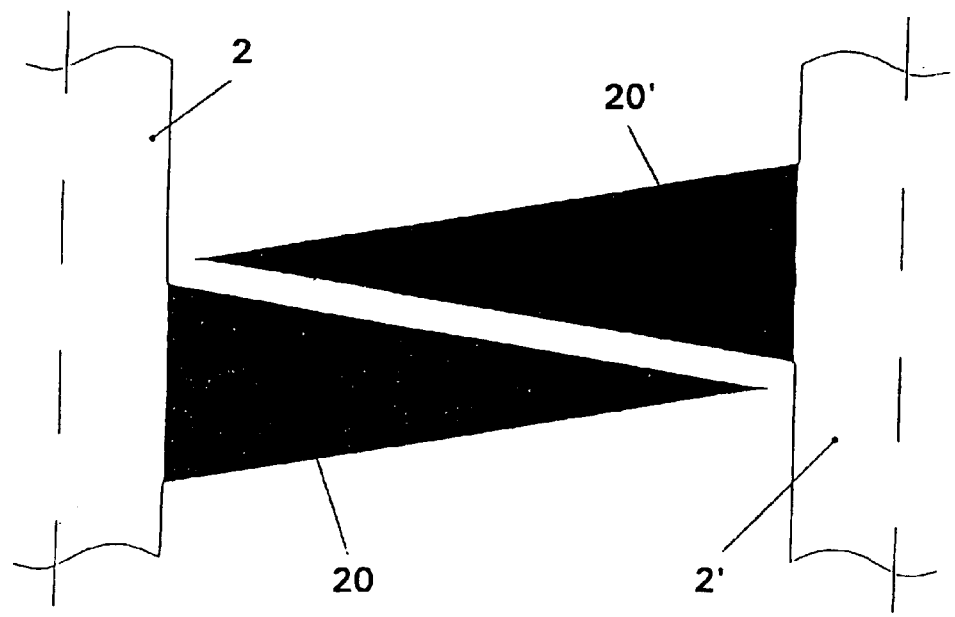
FIG. 5 is an enlarged view of the hollow shafts and membrane discs in the cleaning zone of FIG. 1.

FIG. 5 shows a section from a filtration module 1 as a side view. Here the specially designed membrane discs 20, 20' with their triangular cross-sectional shape can be seen. In addition to this shape, and the rectangular cross-sectional shape according to FIG. 1, the membrane discs may have freely defined cross-sectional shapes for special designs. Triangular cross-sectional shapes are also applied wherever a large filter area is required on as narrow a space as possible. The cross section of discs 20, 20' is to be dimensioned such that it enlarges in the direction of the permeate discharge toward the hollow shaft 2, 2' and in line with the larger permeate quantity. The advantages of the filtration module according to the invention compared to membrane modules according to the state of the art are based particularly in the lower space requirement, less pipework required, lower energy consumption. Also, no circulation pump to generate the cross flow and the relevant cost is required.

Figure 6:
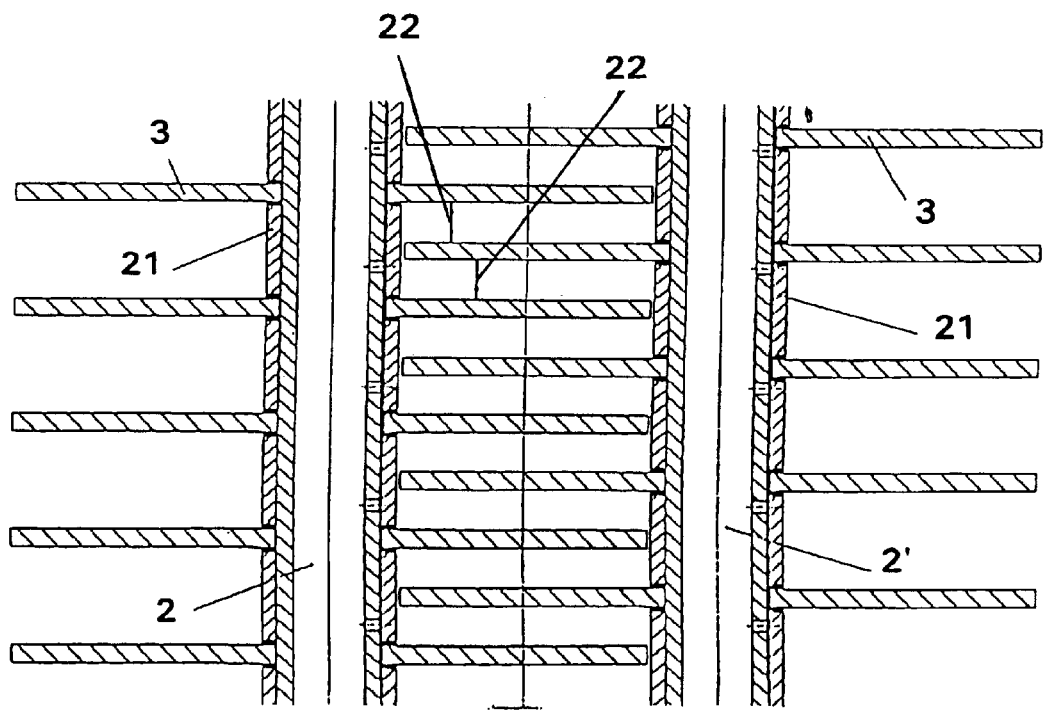
FIG. 6 is a cross section view of a fourth embodiment of a cross-flow filtration module in accordance with the invention.

FIG. 6 shows the section through the structure of a filtration module. For instance, membrane discs 3 with rectangular cross section are arranged on hollow shafts 2, 2'. Sleeves 21, which are exchangeable and mounted on the hollow shafts 2, 2', serve for setting the spacing of the membrane discs 3 between each other. Due to the length of these sleeves 21 the retentate channel 22, i.e. the distance at two membrane discs 3 mounted on different hollow shafts 2, 2' in the overlapping area can be set according to the requirements. The width of the retentate channel 22 is essentially dependent on the viscosity of the retentate.

Figure 7:
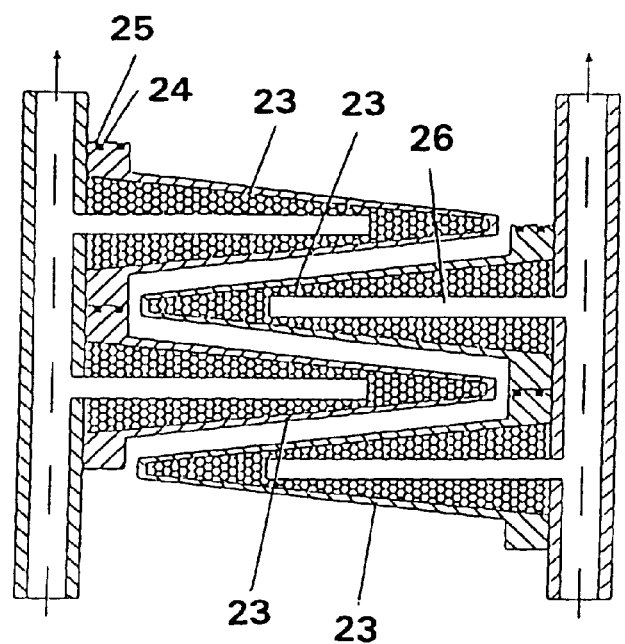
FIG. 7 is cross section view of a fifth embodiment of a cross-flow filtration module in accordance with the invention.

Alternatively, the membrane discs 23 can be arranged directly adjacent to each other, as shown in FIG. 7. If the cross-sectional shapes are suitably selected, the membrane discs 23 can be slid on the hollow shaft 2, 2' directly one after, with adjacent discs 23 being sealed together by a sealing ring 25 disposed within a groove 24 on one of the discs 23. The retentate channel 26 then results from the design of the membrane discs 23.

Figure 8:
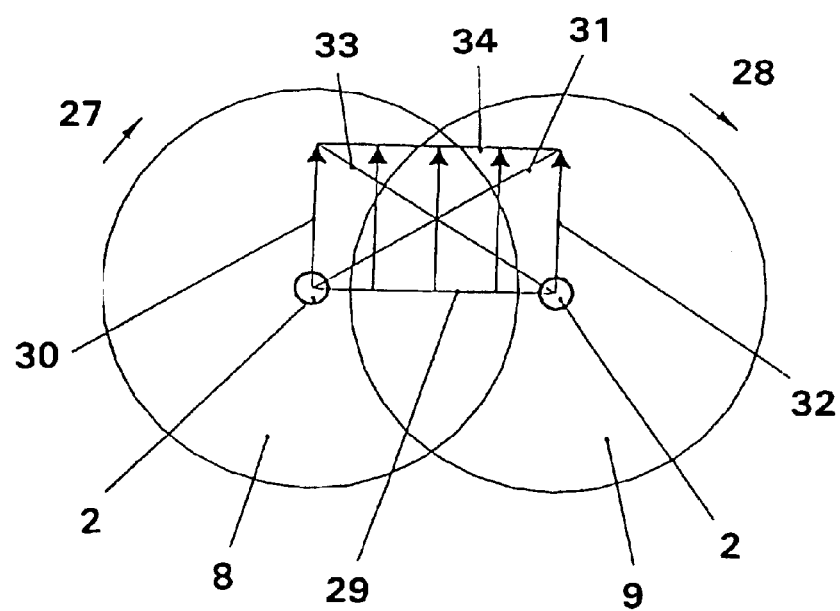
FIG. 8 is a side view of the cross-flow filtration module of FIG. 1, illustrating the speed distribution over the membrane discs.

FIG. 8 shows a horizontal projection analogous to FIG. 2. Membrane disc 8 rotates in direction 27 and membrane disc 9 in direction 28. The circumferential speed of the individual membrane discs 8, 9 and the relative speed resulting from this is entered above the line 29 connecting the two hollow shafts 2, 2'. Disc 8 has a maximum circumferential speed 30, going toward zero in the direction of the axis. This results in speed distribution 31. Analogously, at a maximum circumferential speed 32, a speed distribution 33 results for disc 9. The resulting relative speed 34 is then constant at same rotational speed of the two membrane discs. By varying the rotational speeds, a desired relative speed can be adjusted.

WORKING EXAMPLE

In a system according to the invention, containing inorganic membrane discs (50 nm pore size, 152 mm diameter) the most varied media were filtered and/or concentrated.

For the tests with white water from the paper machine area, at an inlet concentration of 0.1% DS and a final concentration of 11% DS an average specific filtration capacity of 270 l/m$^2$ h was achieved. The overflow speed was 2 m/sec. The required chemical cleaning interval was 450 hours in this case.

Normally, overflow speeds between 1 and 5 m/see and pressures between 0.5 and 6 bar are selected. In doing so it has been found that a higher flux (specific membrane capacity) is achieved than in conventional cross-flow operation with tubular membranes, depending on the medium and its contents, depending also on the rotational speed and spacing between the membrane discs and the filtration pressure and temperature setting.

What is claimed is:

1. Process for cross-flow filtration of a fluid to produce a flow of concentrate and a flow of filtrate using a filtration device having a plurality of rotating membrane discs mounted on at least first and second hollow shafts, each of the membrane discs having a hollow disc body in fluid communication with the associated hollow shaft, a triangular cross section, and first and second membrane surfaces, the membrane discs mounted on a one of the hollow shafts overlapping the membrane discs mounted on another of the hollow shafts in an overlap area, the process comprising the steps of:

rotating the hollow shafts and the membrane discs mounted thereon at a rotational speed;

introducing the fluid into at least the overlap area of the filtration device;

creating overflow speeds at the membrane surfaces in the range of 1 to 5 m/sec;

creating a turbulence between the membrane surfaces of at least two membrane discs in the overlap area;

diffusing a portion of the fluid through the membrane surfaces of the membrane discs into the hollow disc body to create a permeate within the hollow disc body and a concentrate exteriorly of the membrane surfaces;

collecting the permeate within the hollow shaft from the hollow disc bodies of the membrane discs mounted thereon;

discharging the permeate from the hollow shaft as the flow of filtrate; and discharging the flow concentrate from the overlap area at an overpressure.

2. Process for cross-flow filtration of a fluid to produce a flow of concentrate and a flow of filtrate using a filtration device having a plurality of rotating membrane discs mounted on at least first and second hollow shafts, each of the membrane discs having a hollow disc body in fluid communication with the associated hollow shaft and first and second membrane surfaces, the membrane discs mounted on a one of the hollow shafts overlapping the membrane discs mounted on another of the hollow shafts in an overlap area, the process comprising the steps of:

rotating the hollow shafts and the membrane discs mounted thereon at a rotational speed;

introducing the fluid into at least the overlap area of the filtration device;

creating overflow speeds at the membrane surfaces in the range of 1 to 5 m/sec;

creating a turbulence between the membrane surfaces of at least two membrane discs in the overlap area;

diffusing a portion of the fluid through the membrane surfaces of the membrane discs into the hollow disc body to create a permeate within the hollow disc body and a concentrate exteriorly of the membrane surfaces;

collecting the permeate within the hollow shaft from the hollow disc bodies of the membrane discs mounted thereon;

discharging the permeate from the hollow shaft as the flow of filtrate; and discharging the flow concentrate from the overlap area at an overpressure of 10 to 14 bar.

3. Process according to claim 1, wherein each of the membrane discs have different rotational speeds.

4. Process according to claim 1, further comprising the step of discharging the permeate at a vacuum.

5. Process according to claim 4, wherein the vacuum is up to 0.5 bar.

6. Process according to claim 2, wherein the membrane discs have a rectangular cross section.

7. Process according to claim 2, wherein each of the membrane discs have different rotational speeds.

8. Process according to claim 2, further comprising the step of discharging the permeate at a vacuum.

9. Process according to claim 8, wherein the vacuum is up to 0.5 bar.

* * * * *